US012286157B1

(12) United States Patent
Morris et al.

(10) Patent No.: US 12,286,157 B1
(45) Date of Patent: Apr. 29, 2025

(54) INTEGRATED MOUNTING FOR DRIVE UNITS AND STEERING RACKS

(71) Applicant: Rivian IP Holdings, LLC, Irvine, CA (US)

(72) Inventors: Caleb Alex Morris, Bloomington, IL (US); Mason Verbridge, Canton, MI (US); Fernando Figueroa Pilz, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/484,418

(22) Filed: Oct. 10, 2023

(51) Int. Cl.
  *B62D 21/11* (2006.01)
  *B60K 1/00* (2006.01)
  *B62D 3/12* (2006.01)
  *B60K 5/00* (2006.01)

(52) U.S. Cl.
  CPC ............... *B62D 21/11* (2013.01); *B60K 1/00* (2013.01); *B62D 3/12* (2013.01); *B60K 5/00* (2013.01)

(58) Field of Classification Search
  CPC . B62D 21/11; B62D 3/12; B60K 1/00; B60K 5/00
  See application file for complete search history.

(56) References Cited

U.S. PATENT DOCUMENTS

| 7,384,069 B2* | 6/2008 | Green | B62D 7/22 280/775 |
| 11,279,226 B2* | 3/2022 | Kim | B62D 21/11 |
| 2020/0140008 A1* | 5/2020 | Krolo | B62D 21/09 |

FOREIGN PATENT DOCUMENTS

| JP | H0635608 U | * | 9/1999 |
| JP | 2001080369 A | * | 3/2001 |
| JP | 2001354162 A | * | 12/2001 |

OTHER PUBLICATIONS

JP-2001080369-A Machine English Translation (Year: 2001).*
JPH0635608 U Machine English Translation (Year: 1999).*
JP-2001354162-A Machine English Translation (Year: 2001).*

* cited by examiner

*Primary Examiner* — Jason D Shanske
*Assistant Examiner* — Matthew James O'Neill
(74) *Attorney, Agent, or Firm* — BAKERHOSTETLER (57) ABSTRACT

A drive unit includes mounts coupled to an existing structure (e.g., steering rack) in a vehicle. The steering rack may provide mass damping to the drive unit during operation, thus providing NVH performance. The mounts may include an isolator designed to provide isolation for a component from vibration generated by the drive unit. Alternatively, a steering rack housing may carry isolators, and the mounts may couple to the isolators in the steering rack housing. Using an existing structure in the vehicle, the number of components and manufacturing complexity may be reduced.

20 Claims, 11 Drawing Sheets

INTEGRATED MOUNTING FOR DRIVE UNITS AND STEERING RACKS

INTRODUCTION

A drive unit may include mounts used to secure the drive unit within a vehicle. The mounts may be equipped with an isolator that secures with a steering rack.

SUMMARY

This application is directed to mounts for drive units, and more particularly, to connecting one or more mounts to components within a vehicle, such as a steering rack. The steering rack may function as a mass damper to absorb vibration from the drive unit, while the isolator provides isolation to the steering rack from vibration generated by the drive unit. Also, the steering rack represents a preexisting structure in the vehicle. Beneficially, the manufacturing complexity and the number of parts of the vehicle may be reduced.

In accordance with one or more aspects of the disclosure, an assembly is described. The assembly may include a first mount extending from a drive unit. The first mount may carry a first isolator configured to secure with a frame rail. The assembly may further include a second mount extending from the drive unit. The second mount may carry a second isolator. The assembly may further include a steering rack coupled to the second isolator.

The assembly may further include a subframe coupled to the drive unit. The assembly may further include a steering rack mount coupled to the subframe. In one or more implementations, the steering rack extends through the second mount and passes through the steering rack mount.

During operation of the drive unit, the steering rack may be configured to reduce an amplitude of vibration of the drive unit. The first isolator may include a first rubber bushing. The second isolator may include a second rubber bushing.

In one or more implementations, in response to a torque applied to a shaft by the drive unit: the first mount is configured to provide a first counterforce in a first direction, and the second mount is configured to provide a second counterforce in a second direction opposite the first direction.

The assembly may further include a third mount extending from the drive unit. The third mount may carry a third isolator. In one or more implementations, the steering rack is coupled with the third isolator.

The second mount may include a first tapered mount. The third mount may include a second tapered mount.

In accordance with one or more aspects of the disclosure, an assembly is described. The assembly may include a first mount extending from a drive unit. The first mount may carry a first isolator configured to couple with a frame rail. The assembly may further include a second mount extending from the drive unit. The assembly may further include a steering rack housing. The steering rack housing may carry a second isolator. The assembly may further include a connector coupled to the second isolator and the second mount. The connector may include a bolt.

The assembly may further include a steering rack at least partially carried within the steering rack housing. The assembly may further include a subframe coupled to the drive unit and the steering rack housing. The assembly may further include a steering rack mount coupled to the subframe. In one or more implementations, the steering rack extends through the second mount and couples to the steering rack mount. The second mount may be positioned between the steering rack and the subframe.

The assembly may further include a third isolator carried by the steering rack housing. The assembly may further include a third mount extending from the drive unit and coupled to the third isolator by a second connector. In one or more implementations, the steering rack housing is at least partially positioned between the second mount and the third mount. The steering rack may be configured to reduce an amplitude of vibration of the drive unit.

In accordance with one or more aspects of the disclosure, a vehicle is described. The vehicle may include a first mount extending from a drive unit. The first mount may carry a first isolator coupled with a frame rail. The vehicle may further include a second mount extending from the drive unit. The vehicle may further include a steering rack housing. The vehicle may further include a second isolator coupled to the second mount and the steering rack housing.

The vehicle may further include a steering rack at least partially carried by the steering rack housing. In one or more implementations, the second isolator is carried by the second mount, and the steering rack extends through the second mount and engages the second isolator. The steering rack may be configured to reduce an amplitude of vibration of the drive unit.

The vehicle may further include a connector. In one or more implementations, the steering rack housing carries the second isolator, and the connector is coupled to the second isolator and the second mount.

The vehicle may further include a subframe coupled to the drive unit and the steering rack housing.

BRIEF DESCRIPTION OF THE DRAWINGS

Certain features of the subject technology are set forth in the appended claims.

However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is directed to an assembly that includes mounts (e.g., brackets) that couple a drive unit to various structures in a vehicle. For example, in one or more implementations, one or more mounts extend from the drive unit in a location that allows the mount(s) to couple to a steering rack of the vehicle. In addition to the mounts, the assembly may include an isolator (e.g., bushing) carried by (e.g., positioned in) the mounts. The steering rack may pass through one or more of isolators. Beneficially, the steering rack, representing an existing component of the vehicle, may be used to secure the drive unit as well as provide benefits, such as mass damping to the drive unit, reduced manufacturing complexity, and noise, vibration, and harshness (NVH) performance to the vehicle. Moreover, the isolator may provide a counterforce to torque generated by the drive unit, thus minimizing the impact (e.g., amplitude of vibration) to the steering rack.

Based on the relocation of the mounts, additional mounts and isolators may be relocated on the drive unit. For example, some mounts may be re-positioned and coupled to a frame rail of the vehicle. By re-positioning the mount(s) to couple to the frame rail, the drive unit may provide more commonality, or symmetry, with another drive unit. In this regard, vehicles with a front drive unit and rear drive unit may be relatively similar in terms of the respective locations of the mounts, thus reducing manufacturing complexity.

Figure 1:
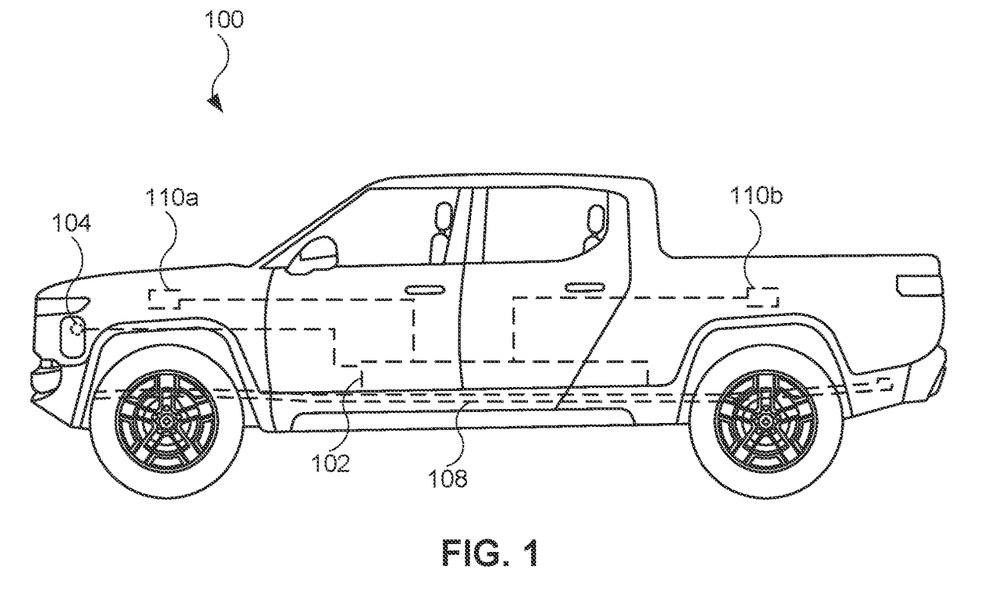
FIG. 1 illustrates an example of a vehicle, in accordance with aspects of the present disclosure.

FIG. 1 illustrates an example of a vehicle 100, in accordance with aspects of the present disclosure. In one or more implementations, the vehicle 100 is a sport utility vehicle (SUV). In the example shown in FIG. 1, the vehicle 100 is a truck. Generally, the vehicle 100 may take the form of any motorized vehicle, including motorized vehicles with an internal combustion engine and/or one or more electric motors. Accordingly, other implementations of the vehicle 100 may include land-based vehicles, such as a car (e.g., sedan, hatchback), a van, or a commercial truck, as non-limiting examples.

The vehicle 100 may include a battery pack 102. The battery pack 102 may be coupled (e.g., electrically coupled) to one or more electrical systems of the vehicle 100 to provide power to the one or more electrical systems. The vehicle 100 may further include a port 104 (e.g., charge port) designed to receive a cable connector (not shown in FIG. 1) used to transmit power (e.g., alternating current (AC) power) that is converted to direct current (DC) power to charge the battery pack 102. The vehicle 100 may include a chassis 108 used to support the battery pack 102 and various other components (not shown in FIG. 1) of the vehicle 100, such as a suspension, as non-limiting examples.

The battery pack 102 may couple to a drive unit 110a and a drive unit 110b, also referred to as a front drive unit and a rear drive unit, respectively. Each of the drive units 110a and 110b may include, for example, a motor, an inverter, a gear box, and a differential. In the example shown in FIG. 1, each of the drive units 110a and 110b takes the form of an electric motor. In this regard, each of the drive units 110a and 110b may use energy (e.g., electrical energy) stored in the battery pack 102 for propulsion in order to drive (e.g., rotationally drive) wheels of the vehicle 100.

Figure 2:
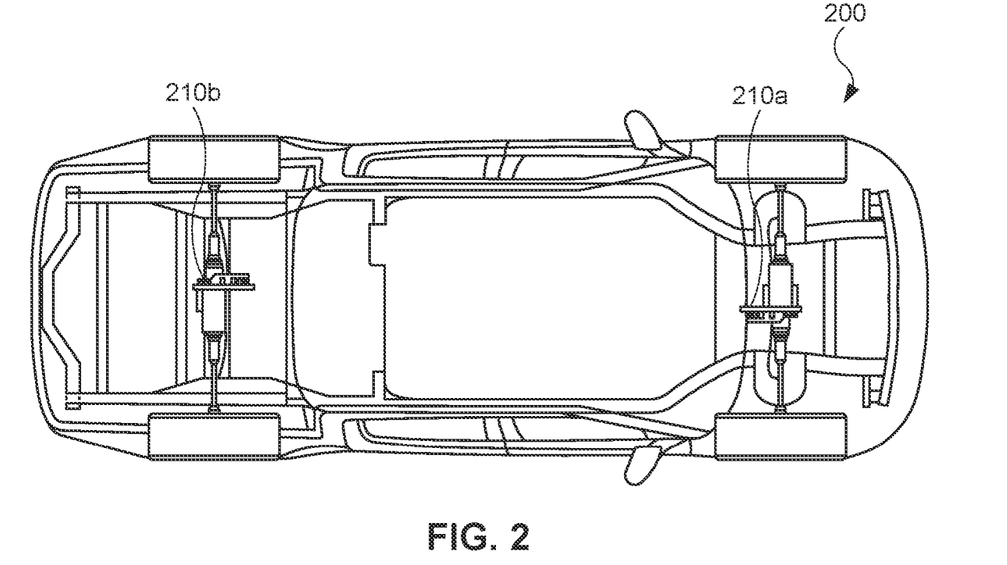
FIG. 2 illustrates an aerial view of a vehicle, showing an example of drive units in the vehicle, in accordance with aspects of the present disclosure.

FIG. 2 illustrates an aerial view of a vehicle 200, showing an example of drive units of the vehicle 200, in accordance with aspects of the present disclosure. As shown, the vehicle 200 includes a drive unit 210a and a drive unit 210b, also referred to as a front drive unit and a rear drive unit, respectively. Each of the drive units 210a and 210b may include a single motor, such as an electric motor. In this regard, the vehicle 200 may be referred to as a dual-motor vehicle.

Figure 3:
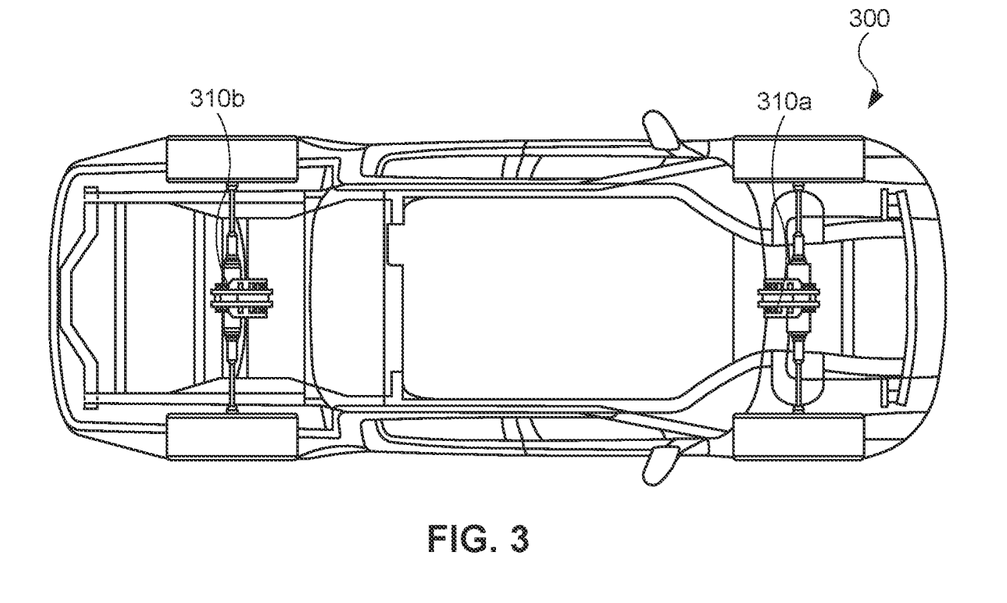
FIG. 3 illustrates an aerial view of a vehicle, showing an alternate example of drive units in the vehicle, in accordance with aspects of the present disclosure.

FIG. 3 illustrates an aerial view of a vehicle 300, showing an alternate example of drive units of the vehicle 300, in accordance with aspects of the present disclosure. As shown, the vehicle 300 includes a drive unit 310a and a drive unit 310b, also referred to as a front drive unit and a rear drive unit, respectively. Each of the drive units 310a and 310b may include two motors, with each motor taking the form of an electric motor. In this regard, the vehicle 300 may be referred to as a quad-motor vehicle.

The drive unit configurations shown and described in FIG. 2 and FIG. 3 should be consider exemplary and non-limiting and other drive unit configurations are possible. For example, one or more vehicles shown and/or described herein may include a drive unit with a single motor (e.g., in the front or the rear) or multiple drive units with an unequal number of motors (e.g., a single motor drive unit in the front and a dual motor drive unit in the rear).

Figure 4:
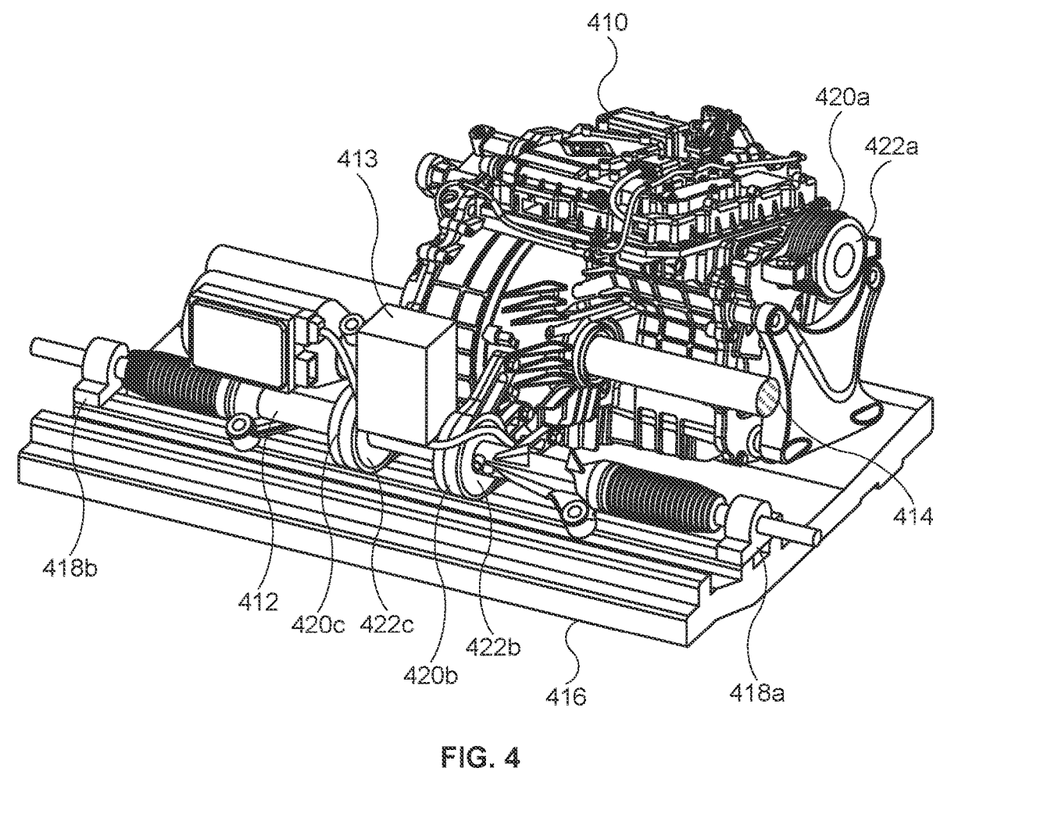
FIG. 4 illustrates a perspective view of an example of a drive unit and a steering rack coupled to the drive unit, in accordance with aspects of the present disclosure.

FIG. 4 illustrates a perspective view of an example of a drive unit 410 and a steering rack 412 coupled to the drive unit 410, in accordance with aspects of the present disclosure. The drive unit 410 and the steering rack 412 may be implemented in a vehicle (e.g., vehicle 100 shown in FIG. 1). The drive unit 410 may include any example for a drive unit previously described. Thus, the drive unit 410 may take the form of a front drive unit, or alternatively, a rear drive unit. As shown, the drive unit 410 may include a shaft 414. The shaft 414 is designed to couple to one or more wheels (not shown in FIG. 4). The drive unit 410 may provide a force (e.g., torque) to the shaft 414, thus driving (e.g., rotationally driving) the shaft 414 to drive the wheels. The steering rack 412 may be coupled to the wheels and a steering wheel (not shown in FIG. 4), thus allowing a user of the vehicle to steer the vehicle by way of turning the steering wheel. Additionally, a subframe 416 may provide a base for the drive unit 410 and the steering rack 412. The drive unit 410 may be coupled to (e.g., bolted, welded, or otherwise fastened) to the subframe 416. Further, the steering rack 412 may be coupled to the subframe 416 by a steering rack mount 418a and a steering rack mount 418b. As shown, the steering rack 412 may pass through each of the steering rack mounts 418a and 418b. Additionally, a steering rack housing 413 may carry several components (e.g., power steering, electronic controls or the like) used with the steering rack 412. The steering rack housing 413 may couple to the drive unit 410.

The drive unit 410 may include an assembly of several components used to couple (e.g., connect) the drive unit 410 to another component. For example, the drive unit 410 may include a mount 420a used to couple the drive unit 410 to, for example, a frame rail (not shown in FIG. 4). Although not shown, an additional mount, similar to the mount 420a, may be positioned at an opposing location on the drive unit 410. Additionally, the drive unit 410 may include a mount 420b and a mount 420c, each of which extend from the drive unit 410 to couple with the steering rack 412. Beneficially, by using an existing component (e.g., the steering rack 412) in the vehicle, fewer parts may be required, which may reduce manufacturing complexity, as well as provide additional space within the vehicle for other components. Each of the mounts 420a, 420b, and 420c (representative of other mounts shown and/or described herein) may include metal, such as steel, nickel, aluminum, or a combination thereof, as non-limiting examples.

During operation, the drive unit 410 may produce a torque, thereby creating reaction force at one or more locations in which the drive unit 410 is mounted. As a result, at least some of the torque may be transmitted to the steering rack 412 and/or the aforementioned frame rail. In order to dampen the resultant energy (e.g., vibration) due the torque, the assembly of components may further include an isolator, or bushing, with an isolator carried by one of the mounts 420a, 420b, and 420c. For example, the mount 420a may include an isolator 422a designed to receive a crossmember (not shown in FIG. 4). The isolator 422a, representative of additional isolators shown and/or described herein, may include a rubber compound, as a non-limiting example. The mount 420b and the mount 420c may include an isolator 422b and an isolator 422c, respectively. The steering rack 412 may engage with the isolator 422b and 422c. For example, the steering rack 412 may pass through respective openings of the isolators 422b and 422c. By re-locating the mounts 420b and 420c (e.g., in a manner such that the steering rack 412 passes through the isolators 422b and 422c), an additional clearance zone(s) is/are created by the space formerly occupied by the mounts 420b and 420c in their prior respective locations. Beneficially, one or more components may occupy the prior locations of the mounts 420b and 420c.

Figure 5:
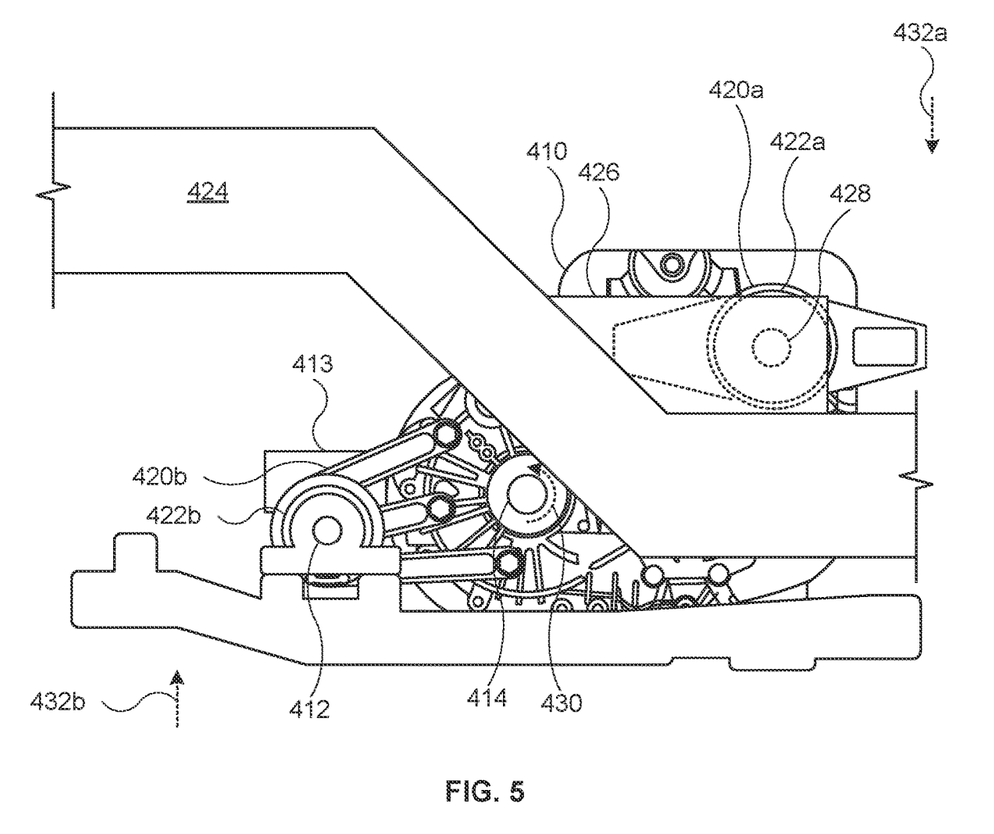
FIG. 5 illustrates a side view of a drive unit and a steering rack coupled to the drive unit, further showing the drive unit coupled to a frame rail, in accordance with aspects of the present disclosure.

FIG. 5 illustrates a side view of the drive unit 410 and the steering rack 412 coupled to the drive unit 410, further showing the drive unit 410 coupled to a frame rail 424, in accordance with aspects of the present disclosure. The frame rail 424 may include a structure 426 (e.g., extension) that carries a crossmember 428. The crossmember 428 may be positioned in the isolator 422a that is carried by the mount 420a.

To illustrate the use of the mount 420a and the mount 420b, a force diagram is shown. For example, during operation of the drive unit 410, a force (e.g., torque) provided to the shaft 414 may be in a direction of an arrow 430. To counter, or react to, the force provided by the drive unit 410 to the shaft 414, the mount 420a may provide a counterforce in a direction of an arrow 432a and the mount 420b may provide a counterforce in a direction of an arrow 432b. As shown, the arrow 432a and the arrow 432b represent opposite directions, or at least substantially opposite directions. The mount 420c (shown in FIG. 4) may provide a similar counterforce, in the direction of the arrow 432b, as that of the mount 420b. Additionally, the isolator 422a and the isolator 422b may dampen some of the energy due to the torque. Beneficially, energy (e.g., vibration) applied to the steering rack 412 and the frame rail 424 is minimized or prevented.

Additionally, based their respective coupling to the drive unit 410, the steering rack 412 and/or the steering rack housing 413 may provide benefits to the drive unit 410. For example, the steering rack 412 and/or the steering rack housing 413 may function as a secondary mass damper (e.g., tuning mass damper) that reduces the amplitude generated by the vibration of the drive unit 410 during operation. Accordingly, a vehicle using the mounts, isolators, and steering rack in a manner described herein may provide dual isolation to the drive unit 410.

Figure 6:
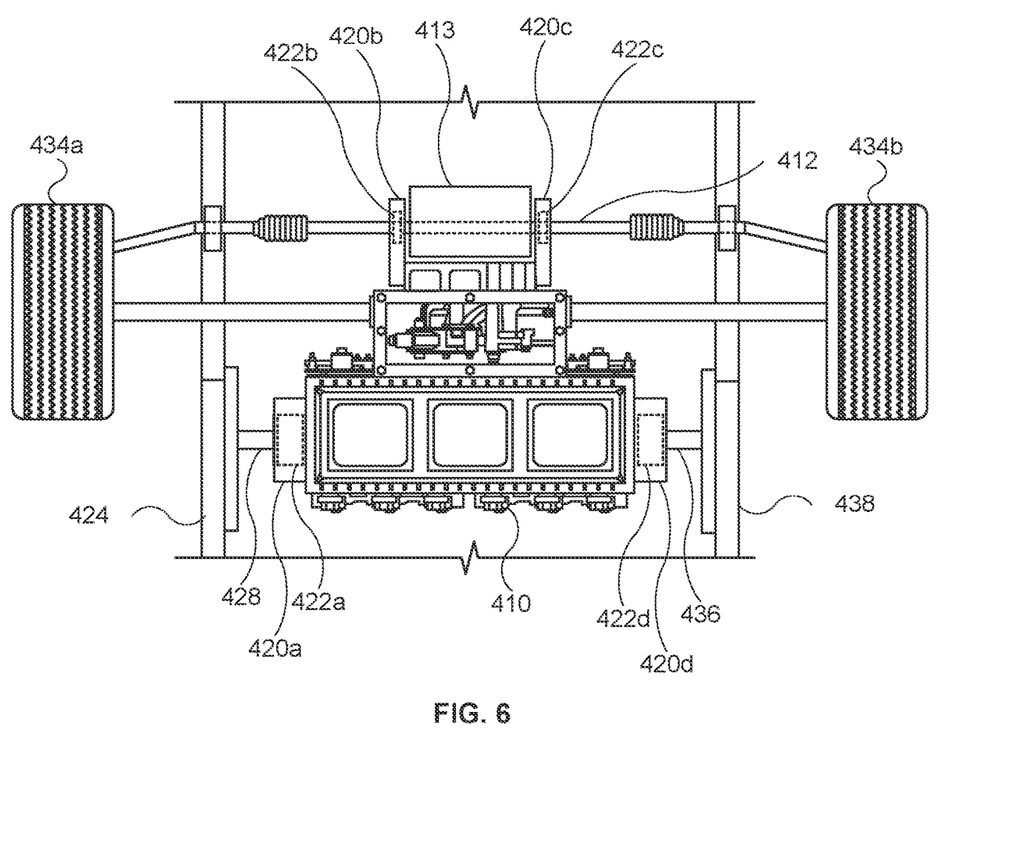
FIG. 6 illustrates an aerial view of a drive unit and a steering rack coupled to the drive unit, in accordance with aspects of the present disclosure.

FIG. 6 illustrates an aerial view of the drive unit 410 and the steering rack 412 coupled to the drive unit 410, in accordance with aspects of the present disclosure. As shown, the steering rack 412 passes through the mount 420b and the mount 420c, and further through the isolator 422b and the isolator 422c, to connect to a wheel 434a and a wheel 434b. Further, the crossmember 428 extends from the frame rail 424 is inserted into the isolator 422a carried by the mount 420a. Also, a crossmember 436 extends from a frame rail 438 and is inserted into an isolator 422d carried by a mount 420d, with the mount 420d coupled to the drive unit 410. Further, the steering rack housing 413 is positioned between the mount 420b and the mount 420c, and passes over the steering rack 412. Beneficially, the mounts 420b and 420c provide no obstruction to the steering rack 412 and the steering rack housing 413, and conversely, the steering rack 412 and the steering rack housing 413 provide no obstruction to the mounts 420b and 420c.

Figure 7:
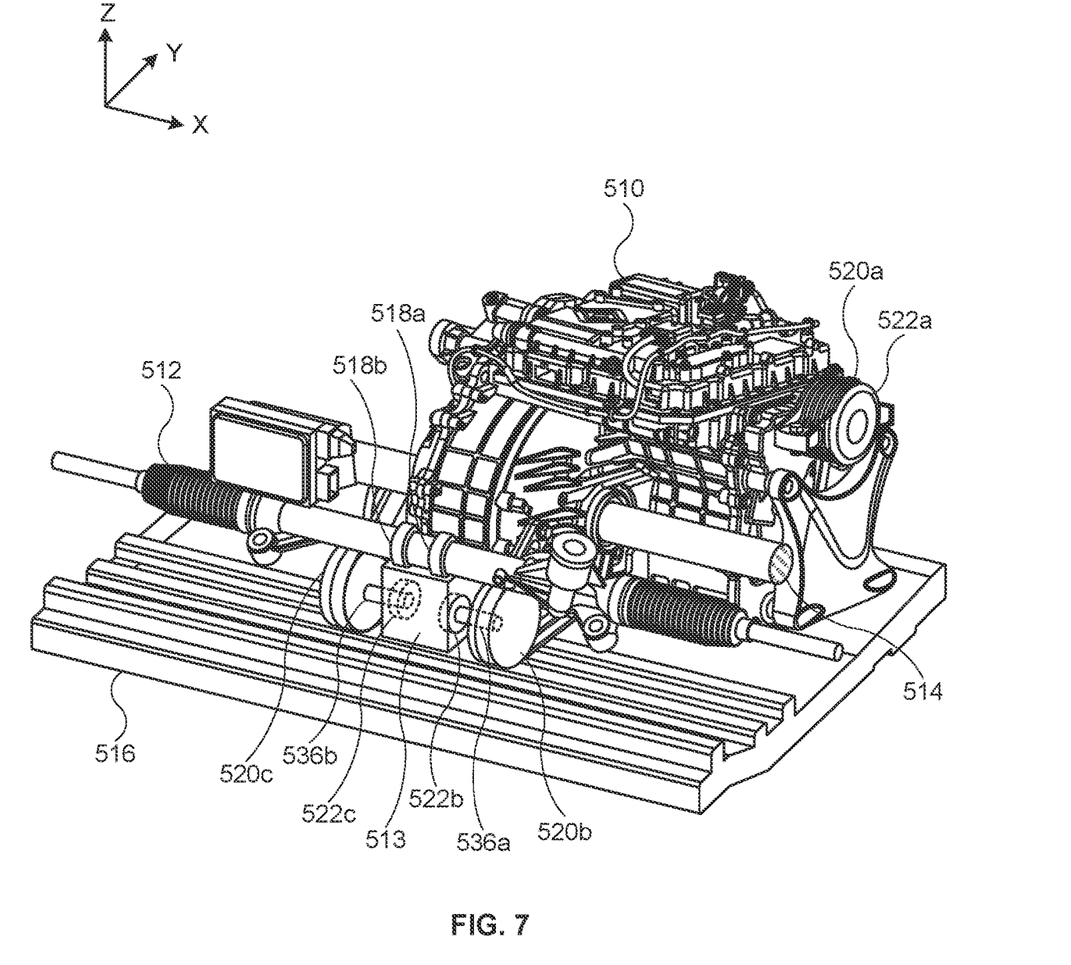
FIG. 7 illustrates a perspective view of an alternate example of a drive unit and a steering rack, showing the drive unit coupled to a steering rack housing, in accordance with aspects of the present disclosure.

FIG. 7 illustrates a perspective view of an example of a drive unit 510 and a steering rack 512, showing the drive unit 510 coupled to a steering rack housing 513, in accordance with aspects of the present disclosure. The drive unit 510 and the steering rack 512 may be implemented in a vehicle (e.g., vehicle 100 shown in FIG. 1). The drive unit 510 may include any example for a drive unit previously described. Thus, the drive unit 510 may take the form of a front drive unit, or alternatively, a rear drive unit. Also, the drive unit 510 may include similar features as shown in prior examples, such as a shaft 514 designed to couple to one or more wheels (not shown in FIG. 7), and a subframe 516 to provide a base for the drive unit 510 and the steering rack 512. Also, one or more components of the steering rack 512 may be positioned in, or at least partially positioned in, the steering rack housing 513.

The drive unit 510 may include a mount 520a used to couple the drive unit 510 to, for example, a frame rail (not shown in FIG. 7). The mount 520a may include an isolator 522a. Although not shown, an additional mount, similar to the mount 520a, may be positioned at an opposing location on the drive unit 510. Additionally, the drive unit 510 may include a mount 520b and a mount 520c. As shown, the steering rack 512 passes over (e.g., along the Z-axis of Cartesian coordinates) the mounts 520b and 520c, and accordingly, the steering rack 512 is not directly coupled to the mounts 520b and 520c. The steering rack 512 may be secured to the steering rack housing 513 using a steering rack mount 518a and a steering rack mount 518b. Although not shown in FIG. 7, the steering rack 512 may pass below (e.g., along the Z-axis of Cartesian coordinates) the mounts 520b and 520c, while remaining not directly coupled to the mounts 520b and 520c.

Further, the steering rack housing 513 may carry an isolator 522b and an isolator 522c designed to couple to the mount 520b and the mount 520c, respectively. Several connectors may be used to couple the mounts to the isolators. For example, a connector 536a (partially shown as dotted lines) is connected to the mount 520b, and extends from the mount 520b and into the isolator 522b. Further, a connector 536b (partially shown as dotted lines) is connected to the mount 520c, and extends from the mount 520c and into the isolator 522c. As non-limiting examples, each of the connectors 536a and 536b may take the form of a bolt. Based on the isolators 522a and 522b, the steering rack housing 513 may be isolated from vibration during operation of the drive unit 510, while also providing mass dampening to the drive unit 510 to reduce the amplitude of the vibration generated by the drive unit 510 during operation. Further, due in part to the steering rack 512 being coupled to the steering rack housing 513, the mass of the steering rack 512 may also be used for mass damping of the drive unit 510.

Figure 8:
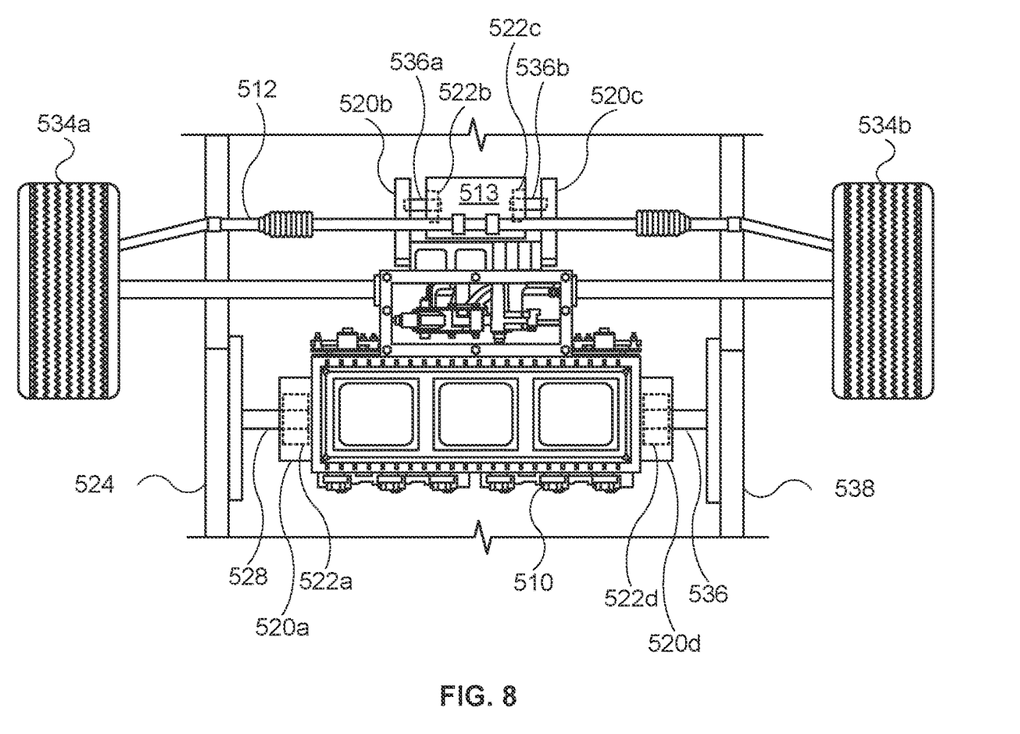
FIG. 8 illustrates an aerial view of a drive unit and a steering rack coupled to the drive unit, in accordance with aspects of the present disclosure.

FIG. 8 illustrates an aerial view of the drive unit 510 and the steering rack 512 coupled to the drive unit 510, in accordance with aspects of the present disclosure. As shown, the mount 520b and the mount 520c are adjusted/re-positioned such that the steering rack 512 passes over the mount 520b and the mount 520c, to connect to a wheel 534a and a wheel 534b. Also, the isolators 522b and 522c may be fully, or at least substantially, embedded in the steering rack housing 513. The isolator 522b is coupled to the mount 520b by the connector 536a, and isolator 522c is coupled to the mount 520c by the connector 536b.

Further, a crossmember 528 extends from the frame rail 524 is inserted into the isolator 522a carried by the mount 520a. Also, a crossmember 536 extends from a frame rail 538 and is inserted into an isolator 522d carried by a mount 520d, with the mount 520d coupled to the drive unit 510.

Figure 9:
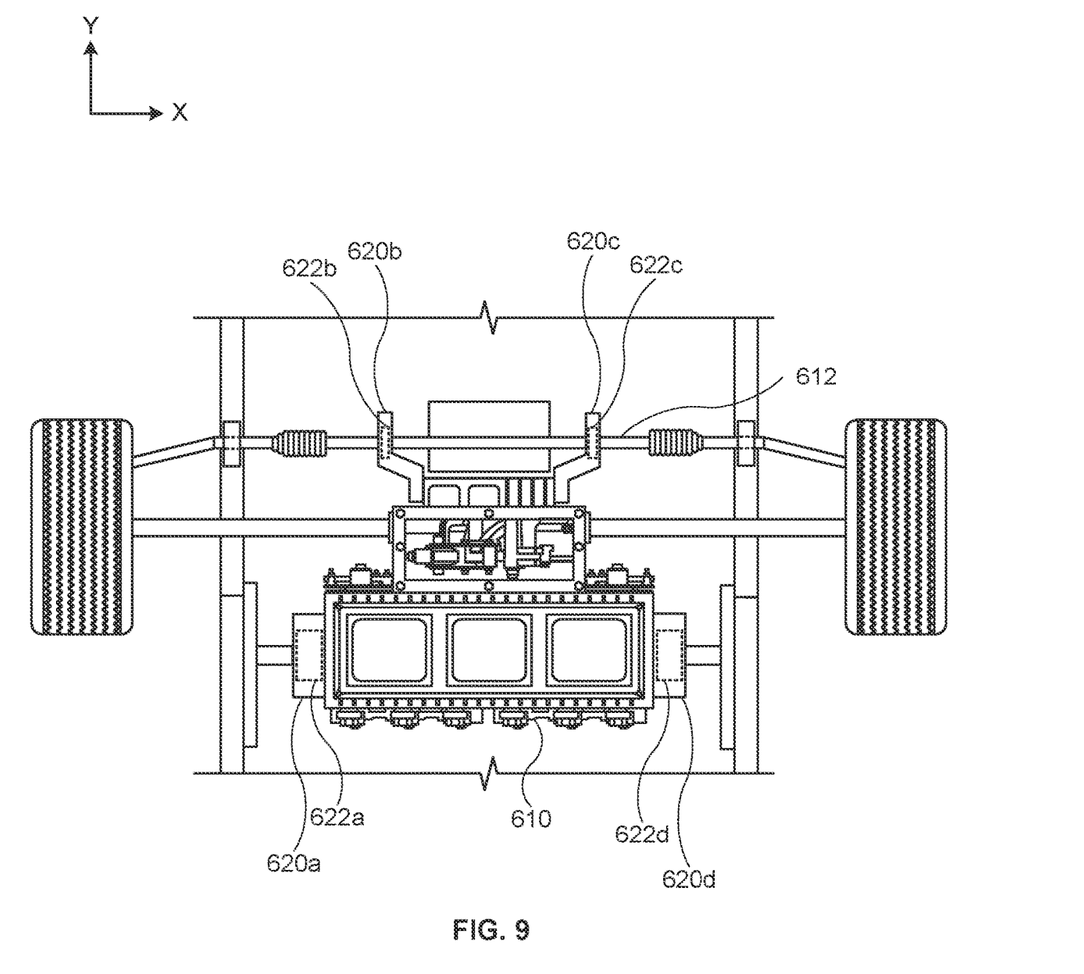
FIG. 9 illustrates an aerial view of an alternate example of a drive unit and a steering rack coupled to the drive unit, showing tapered mounts coupled to the steering rack, in accordance with aspects of the present disclosure.

FIG. 9 illustrates an aerial view of an alternate example of a drive unit 610 and a steering rack 612 coupled to the drive unit 610, showing tapered mounts coupled to the steering rack 612, in accordance with aspects of the present disclosure. The drive unit 610 and the steering rack 612 may be implemented in a vehicle (e.g., vehicle 100 shown in FIG. 1). The drive unit 610 may include a mount 620a and a mount 620d, and may further include an isolator 622a and an isolator 622d carried by the mount 620a and the mount 620d, respectively. The drive unit 610 may further include a mount 620b and a mount 620c, as well as an isolator 622b and an isolator 622c carried by the mount 620b and the mount 620c, respectively. As shown, each of the mounts 620b and 620c may take the form of a tapered mount. For example, each of the mounts 620b and 620c are connected to the drive unit 610. However, further from the drive unit 610 (e.g., along a Y-axis of Cartesian coordinates). The mounts 620b and 620c subsequently extend, or flare, outward away from each other (e.g., along the X-axis). Beneficially, any load applied to the steering rack 612 by the mounts 620b and 620c is further from the center of steering rack 612, thus reducing the excitation of the steering rack 612 at or near the center of the steering rack 612.

Figure 10:
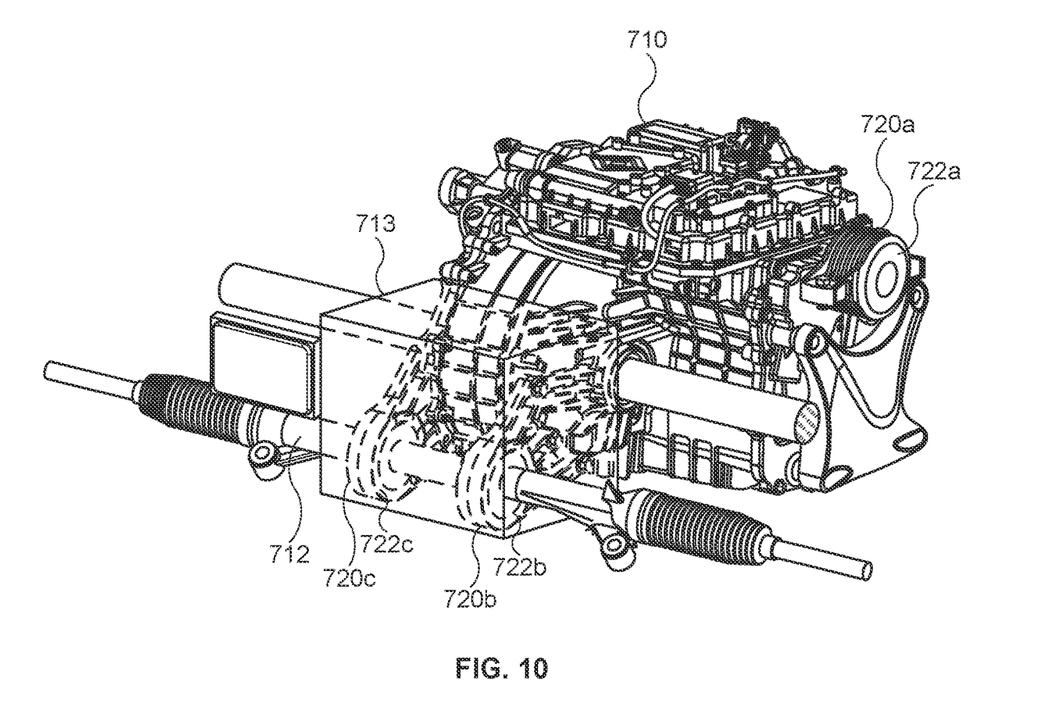
FIG. 10 illustrates a perspective view of an alternate example of a drive unit and several mounts located within a steering rack housing, in accordance with aspects of the present disclosure.

FIG. 10 illustrates a perspective view of an alternate example of a drive unit 710 and several mounts located within a steering rack housing 713, in accordance with aspects of the present disclosure. The drive unit 710 and steering rack housing 713 may be implemented in a vehicle (e.g., vehicle 100 shown in FIG. 1). Similar to prior examples, the drive unit 710 may include a mount 720a and an isolator 722a carried by the mount 720a. The mount 720a and the isolator 722a may be representative of one or more additional mounts and isolators, respectively. The drive unit 710 may further include a mount 720b and a mount 720c located, or at least partially located, in the steering rack housing 713. Additionally, the mount 720b and the mount 720c may carry an isolator 722b and an isolator 722c, respectively. The steering rack 712 may pass through the steering rack housing 713 as well as through respective openings of each of the isolators 722b and 722c. By housing the steering rack 712, several mounts and isolators, the steering rack housing 713 may be provided as a subassembly that is connected to the drive unit 710.

Figure 11:
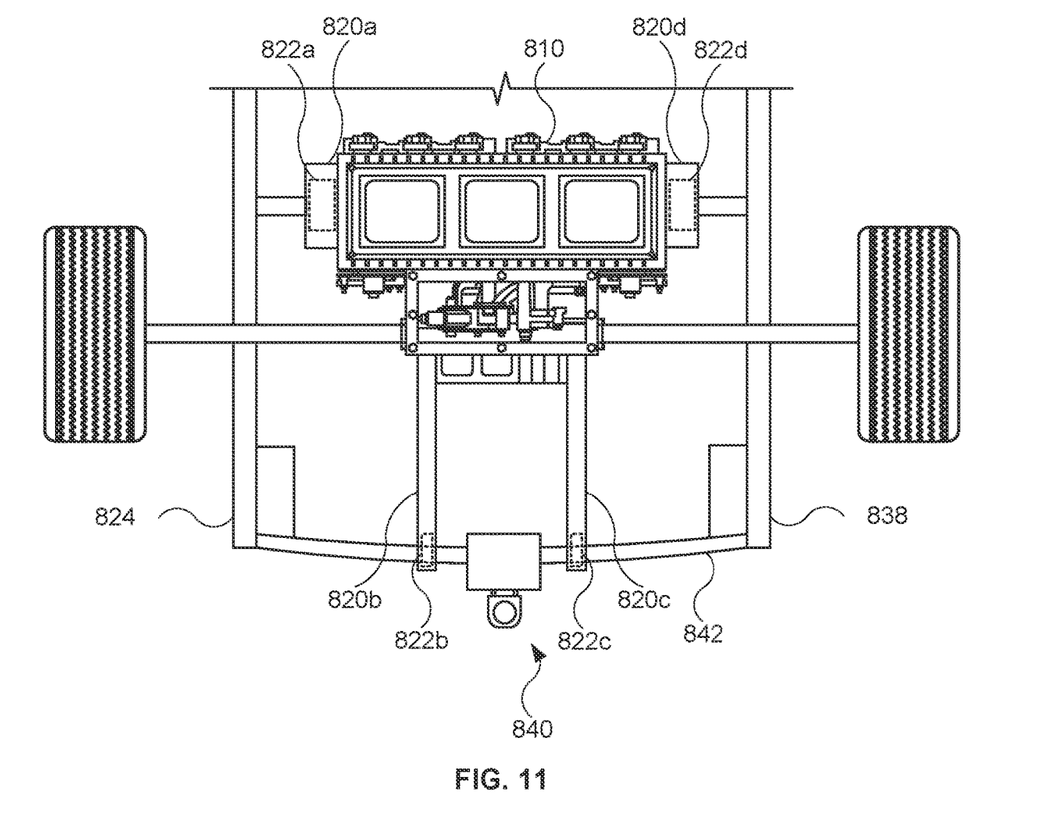
FIG. 11 illustrates a perspective view of an alternate example of a drive unit and a tow hitch coupled to the drive unit, in accordance with aspects of the present disclosure.

FIG. 11 illustrates an aerial view of a drive unit 810 and a tow hitch 840 coupled to the drive unit, in accordance with aspects of the present disclosure. The drive unit 810 and the tow hitch 840 may be implemented in a vehicle (e.g., vehicle 100 shown in FIG. 1). Similar to prior examples, the drive unit 810 may include a mount 820a and a mount 820d, as well as an isolator 822a and an isolator 822d carried by the mount 820a and the mount 820d, respectively. The drive unit 810 may further include a mount 820b and a mount 820c, as well as an isolator 822b and an isolator 822c carried by the mount 820b and the mount 820c, respectively.

The tow hitch 840 is designed to secure various objects to a vehicle, such as a trailer or a mobile camper (as non-limiting examples). The tow hitch 840 may include a crossbar 842 connected to a frame rail 824 and a frame rail 838. Further, the crossbar 842 may pass through the mount 820b and the mount 820c, and in particular, through the isolator 822b and the isolator 822c. Thus, the drive unit 810 may be coupled to the tow hitch 840, and the tow hitch 840 may provide mass damping for the drive unit 810 to reduce an amplitude of vibration generated by the drive unit 810.

Figure 12:
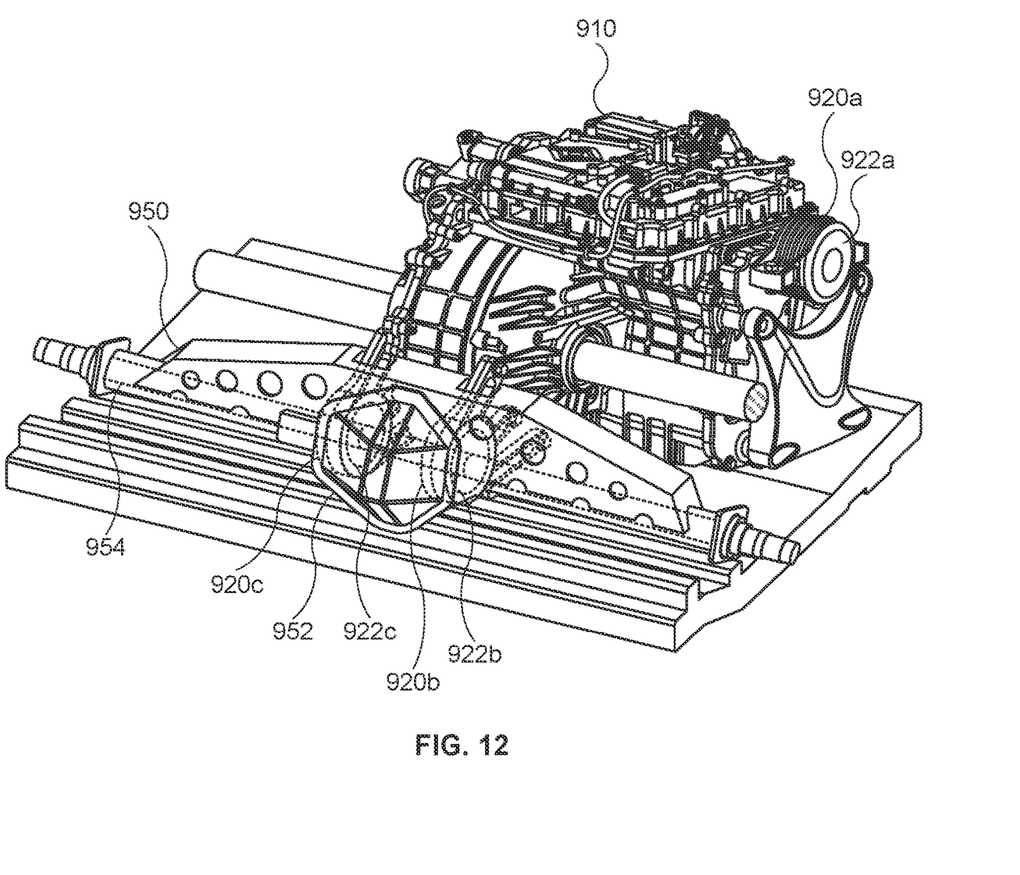
FIG. 12 illustrates an aerial view of a drive unit and an axle truss coupled to the drive unit, in accordance with aspects of the present disclosure.

FIG. 12 illustrates a perspective view of an alternate example of a drive unit 910 and an axle truss 950 coupled to the drive unit 910, in accordance with aspects of the present disclosure. The drive unit 910 and the axle truss 950 may be implemented in a vehicle (e.g., vehicle 100 shown in FIG. 1). Similar to prior examples, the drive unit 910 may include a mount 920a and an isolator 922a carried by the mount 920a. The mount 920a and the isolator 922a may be representative of one or more additional mounts and isolators, respectively. The drive unit 910 may further include a mount 920b and a mount 920c, as well as an isolator 922b and an isolator 922c carried by the mount 920b and the mount 920c, respectively.

The axle truss 950 may secure around an axle 952 and provide to provide reinforcement to the axle 952. The axle truss 950 may include a bar 954 that passes through the mount 920b and the mount 920c, and in particular, through respective openings of the isolator 922b and the isolator 922c. Thus, the drive unit 910 may be coupled to the axle truss 950, and the axle truss 950 may provide mass damping for the drive unit 810 to reduce an amplitude of vibration generated by the drive unit 910.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An assembly, comprising:
a drive unit;
a first mount extending from and attached to the drive unit, the first mount carrying a first bushing configured to secure with a frame rail;
a second mount extending from and attached to the drive unit, the second mount carrying a second bushing;
a third mount extending from and attached to the drive unit, the third mount carrying a third bushing; and
a steering rack passing through and engaging the second bushing and the third bushing.

2. The assembly of claim 1, further comprising:
a subframe coupled to the drive unit; and
a steering rack mount coupled to the subframe, wherein the steering rack extends through the second mount and passes through the steering rack mount.

3. The assembly of claim 1, wherein during operation of the drive unit, the steering rack is configured to reduce an amplitude of vibration of the drive unit.

4. The assembly of claim 1, wherein the first bushing comprises a rubber bushing.

5. The assembly of claim 1, wherein in response to a torque applied to a shaft by the drive unit:
the first mount is configured to provide a first counterforce in a first direction, and
the second mount is configured to provide a second counterforce in a second direction opposite the first direction.

6. The assembly of claim 1, further comprising:
a first steering rack mount; and
a second steering rack mount, wherein the steering rack passes through the first steering rack mound and the second steering rack mount.

7. The assembly of claim 6, wherein:
the second mount comprises a first tapered mount, and
the third mount comprises a second tapered mount.

8. An assembly, comprising:
a first mount extending from a drive unit, the first mount carrying a first isolator configured to couple with a frame rail;
a second mount bolted to the drive unit;
a third mount bolted to the drive unit;
a steering rack housing, the steering rack housing carrying one or more components, wherein the steering rack housing is positioned between the second mount and the third mount;
a second isolator and a third isolator, wherein the second isolator and the third isolator are disposed within the steering rack housing;
a first connector coupled to the second isolator and the second mount;
a second connector coupled to the third isolator and the third mount; and a steering rack mount coupled with the steering rack housing.

9. The assembly of claim 8, wherein the first connector comprises a bolt.

10. The assembly of claim 8, further comprising a steering rack at least partially carried within the steering rack housing.

11. The assembly of claim 10, further comprising a subframe coupled to the drive unit and the steering rack housing.

12. The assembly of claim 11, wherein the steering rack mount is coupled to the subframe, and the steering rack extends through the second mount and couples to the steering rack mount.

13. The assembly of claim 12, wherein the second mount is positioned between the steering rack and the subframe.

14. The assembly of claim 8, further comprising:
a first steering rack mount; and
a second steering rack mount, wherein the steering rack passes through the first steering rack mound and the second steering rack mount.

15. The assembly of claim 8, wherein the steering rack is configured to reduce an amplitude of vibration of the drive unit.

16. A vehicle, comprising:
a drive unit;
a frame rail;
a subframe that carries the drive unit;
a first mount extending from the drive unit, the first mount carrying a first isolator coupled with the frame rail;
a second mount extending from the drive unit;
a steering rack housing;
a second isolator carried by the second mount and the steering rack housing;
a steering rack extending through the second mount and passing through the second isolator; and
a steering rack mount coupled with the subframe, wherein the steering rack passes through the steering rack mount.

17. The vehicle of claim 16, wherein:
the steering rack is at least partially carried by the steering rack housing,
the second isolator is carried by the second mount, and
the steering rack engages the second isolator.

18. The vehicle of claim 16, wherein the steering rack is configured to reduce an amplitude of vibration of the drive unit.

19. The vehicle of claim 16, further comprising a connector, wherein:
the steering rack housing carries the second isolator, and
the connector is coupled to the second isolator and the second mount.

20. The vehicle of claim 16, wherein the subframe is coupled to the drive unit and the steering rack housing.

* * * * *